United States Patent [19]

Kawagoe

[11] Patent Number: 4,718,695
[45] Date of Patent: Jan. 12, 1988

[54] VEHICLE HEIGHT CONTROL SYSTEM WITH FAIL-SAFE OPERATION FOR FAULTY VEHICLE HEIGHT SENSOR

[75] Inventor: Kenji Kawagoe, Yokosuka, Japan

[73] Assignee: Nissan Motor Company, Limited, Kanagawa, Japan

[21] Appl. No.: 861,010

[22] Filed: May 8, 1986

[30] Foreign Application Priority Data

May 13, 1985 [JP] Japan .................. 60-100793

[51] Int. Cl.$^4$ ............................... B60G 17/00
[52] U.S. Cl. ........................... 280/707; 280/6 R
[58] Field of Search .......... 280/6 R, 6 H, 707, DIG. 1

[56] References Cited

U.S. PATENT DOCUMENTS

| 4,462,610 | 7/1984 | Saito et al. | 280/707 |
| 4,466,625 | 8/1984 | Kondo et al. | 280/6 R |
| 4,537,411 | 8/1985 | Naramoto | 280/6 R |

FOREIGN PATENT DOCUMENTS

| 49507 | 3/1983 | Japan | 280/707 |

*Primary Examiner*—John J. Love
*Assistant Examiner*—Karin L. Ferriter
*Attorney, Agent, or Firm*—Schwartz, Jeffery, Schwaab, Mack, Blumenthal & Evans

[57] ABSTRACT

A vehicle height control system has at least two vehicle height sensors which are mounted at points suitable for detecting changes in vehicular profile. Each vehicle height sensor monitors vehicle height at the associated portion of the vehicle and produces a vehicle height indicative signal having a value representative of the vehicle height at the associated portion. The vehicle height control system also has height control means respectively associated with individual suspension systems, each of which is associated with a corresponding vehicle wheel. The height control means is connected to a controller and controlled by means of a control signal selected so as to hold the relative distance between the vehicle body and the vehicular wheels in a given relationship. The controller monitors the output values of the vehicle height sensors so as to detect abnormal output values from one or more of the vehicle height sensors. When the output value of only one of the vehicle height sensors is outside the normal range, the controller simply disables the height control means. On the other hand, when the output values of more than one vehicle height sensor are outside of the normal range, the controller outputs a control signal for lowering the vehicle.

6 Claims, 2 Drawing Figures

VEHICLE HEIGHT CONTROL SYSTEM WITH FAIL-SAFE OPERATION FOR FAULTY VEHICLE HEIGHT SENSOR

BACKGROUND OF THE INVENTION

The present invention relates generally to a height control system for an automotive vehicle suspension system for controlling vehicle height and regulating. The vehicular body profile to improve vehicle driving stability. More specifically, the invention relates to a vehicle height control system capable of detecting failure of a vehicle height sensor monitoring vertical displacement of the corresponding portion of the vehicle body, and performing a fail-safe operation which insures driving safety even when the vehicle height sensor fails.

Various vehicle height control systems have been developed and proposed in recent years. Some such vehicle height control systems include a vehicle height sensor which monitors vertical displacement of the vehicle body relative to the vehicular wheels and performs automatic vehicle height control to suppress pitching, rolling and yawing of the vehicle body. These recently proposed vehicle height control systems hold the vehicle profile stable so as to ensure driving stability. In addition, such vehicle height control systems serve to hold the vehicle body at a desired height, which may be adjusted manually and/or automatically in accordance with vehicle driving conditions.

In order to control the vehicle height acurately, the vehicle body displacement relative to the vehicular wheels has to be monitored accurately. For this purpose, vehicle height sensors may be provided in the vehicular suspension system for monitoring the vertical displacement of the vehicle body relative to the vehicular wheels. As will be appreciated, the acuracy of the vehicle height sensors is essential to the vehicle height control operation. In other words, if one or more vehicle height sensors fails, the vehicle height control will not be able to hold the vehicle level or at the desired height. Failure of the vehicle height sensor is even dangerous, since it may lead to abnormal height adjustment.

SUMMARY OF THE INVENTION

Therefore, it is a principle object of the present invention to provide a vehicle height control system for an automotive vehicle capable of detecting abnormal vehicle height sensor operation and performing a corresponding fail-safe operation.

Another object of the invention is to provide a vehicle height control system which monitors output of the vehicle height sensor, detects abnormalities in the sensor and disables height control when abnormalities in the sensor are detected.

A further object of the invention is to provide a vehicle height control system which acts on the suspension system of each vehicular wheel under normal conditions and is deactivated in response to failure of a vehicle height sensor associated with any of the suspension systems.

A still further object of the invention is to provide a vehicle height control system which lowers the vehicle to the predetermined lowered level when failure of the vehicle height sensor is detected.

In order to accomplish the aforementioned and other object, a vehicle height control system, according to the present invention, has at least two vehicle height sensors which are arranged at positions suitable for detecting changes in vehicular profile. Each vehicle height sensor monitors verticular displacement of the associated portion of the vehicle and produces a vehicle height indicative signal having a value representative of the vehicle height of the associated portion. The vehicle height control system also has height control means associated with individual suspension systems, each of which is associated with a corresponding vehicle wheel. the height control means is connected to a controller and controlled by a control signal so as to hold the relative distance between the vehicle body and the vehicular wheels in a given relationship. The controller monitors the output values of the vehicle height sensor and checks for abnormal output values from any one of the vehicle height sensor. The controller also checks the output values of the other vehicle height sensors when failure of any one of the vehicle height sensors is detected. When the output values of all other height sensors are within an object height range, the controller simply disables the height control means. On the other hand, when the output values of more than one vehicle height sensor is out of the object height range, the controller outputs a control signal for lowering the vehicle.

Thus, even if the vehicle height has been adjusted to outside of the predetermined object height range due to failure of a vehicle height sensor, the vehicle height can be adjusted to the lowered level in a fail-safe operation to ensure vehicle driving stability.

According to one aspect of the invention, a vehicle height control system comprises a vehicle height controlling means having a first component associated with a front suspension system for adjusting the height at the front portion of the vehicle, and a second component associated with a rear suspension system for adjusting the height at the rear portion of the vehicle, a vehicle height monitoring means for monitoring vehicle height, the vehicle height monitoring means including at least a pair of vehicle height sensors associated with the first and second components respectively for generating front and rear vehicle height indicative signals, and a controller selectively receiving one of the front and rear vehicle height indicative signals, producing a control signal for controlling corresponding one of the first and second components of the vehicle height controlling means in accordance with the selected one of the vehicle height indicative signals in order to maintain the vehicle height within a given object height range, checking whether the selected one of the vehicle height indicative signal values is in a predetermined normal range for detecting abnormality of the vehicle height indicative signal value, checking the other of the vehicle height indicative signal value against the object height indicative value range when abnormality of the selected one of vehicle height indicative signals is detected, and producing control signals for the first and second components of the vehicle height controlling means ordering the vehicle to be lowered when abnormality of one of the front and rear vehicle height indicative signal values is detected, and the other vehicle height indicative signal value is out of a object height indicative value range.

In the preferred process, the controller stops vehicle height control and holds the vehicle height controlling means in place when abnormality is detected in one of the vehicle height indicative signal value and the other vehicle height indicative signal value is maintained within the object height indicative value range.

In order to perform vehicle height control for the front and rear portions of the vehicle independently, the vehicle height sensors are connected to the controller through a multiplexer to input the vehicle height indicative signals to the controller alternatingly.

In the preferred embodiment, the vehicle height controlling means comprises a pneumatic pressure control circuit including first and second pneumatic chambers associated with front and rear suspension systems respectively and controls pneumatic pressure in the pneumatic chambers so as to raise and lower the vehicle depending upon the vehicle height indicative signals. The pneumatic pressure control circuit further includes a pneumatic pressure source, a first valve for establishing and blocking fluid communication between the penumatic pressure source and the first pneumatic chamber, a second value for establishing and blocking fluid communication between the pressure source and the second pneumatic chamber, and a third valve disposed adjacent a ventilation port in the pressure control circuit upstream of the first and second valves with respect to the pneumatic pressure source for establishing and blocking communication between the pressure control circuit and atmosphere, and wherein the first, second, and third valves are opened by the control signal produced in response to detection of abnormality in both of the front and rear vehicle height indicative signals. The controller may outputs the control signals for holding the first, second and third valves opened for a predetermined period of time so as to lower the vehicle height when abnormality of both of the first and second vehicle height indicative signal is detected.

DESCRIPTION OF THE PREFERRED EMBODIMENT

Figure 1:
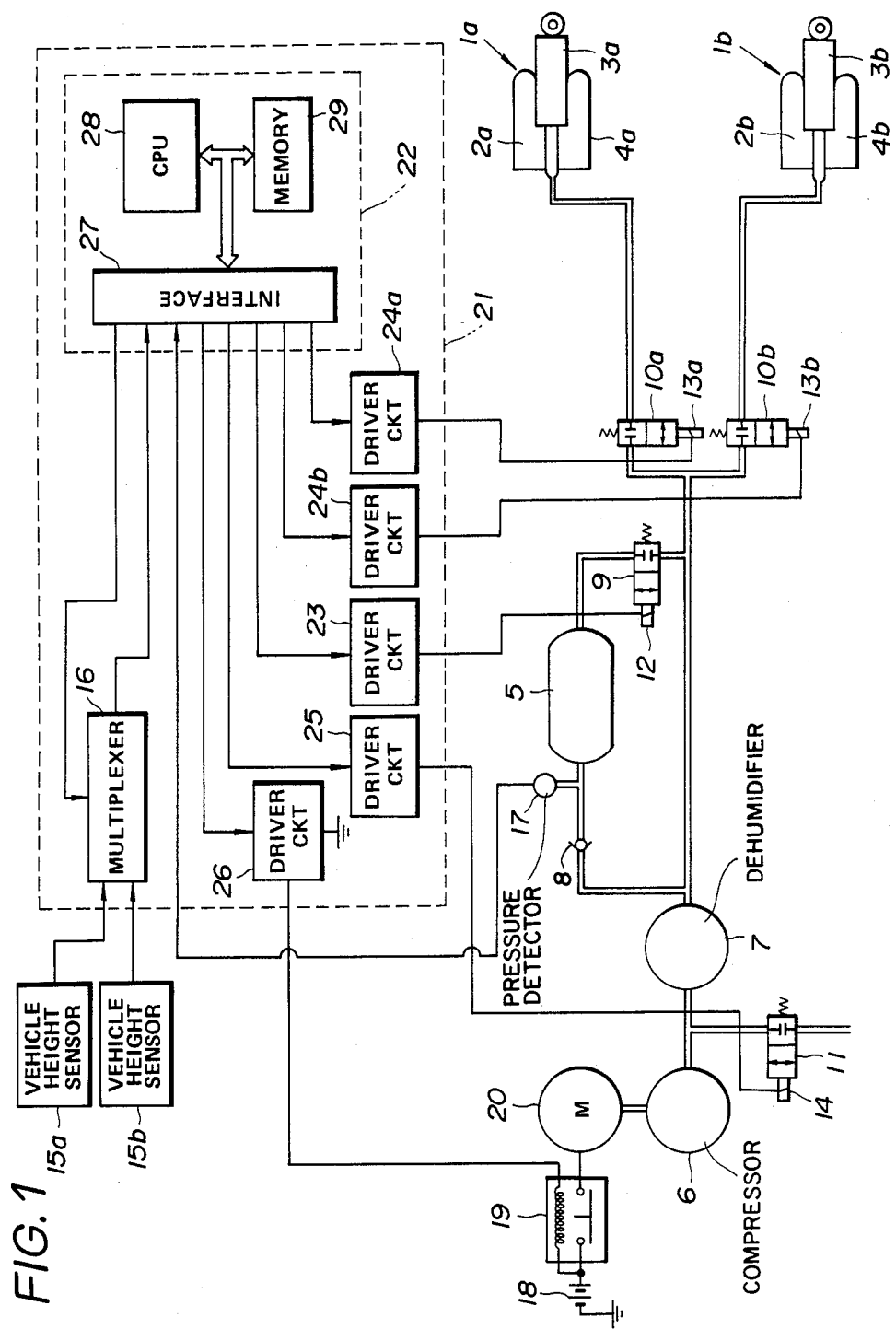
FIG. 1 is a block diagram of the preferred embodiment of a vehicle height control system according to the present invention.

Referring now to the drawings, particularly to FIG. 1, the preferred embodiment of a vehicle height control system, according to the present invention, adjusts vehicle height by adjusting pneumatic pressure in individual vehicular suspension systems. Toward this end, the preferred embodiment of the vehicle height control system employs hydro-pneumatic suspension systems for suspending the vehicle body on vehicular wheels. The hydro-pneumatic suspension systems are preferably controlled independently of each other. In the shown embodiment, the vehicle height control system controls front suspensions and rear suspensions independently of each other. In the following disclosure, the front suspension system is generally represented by the reference numeral 1a and the rear suspension system is generally represented by the reference numeral 1b.

The front and rear suspension systems 1a and 1b respectively includes hydraulic shock absorbers 3a and 3b which generate damping force in response to relative vertical motion between the vehicle body and the vehicular wheels. The front and rear suspension systems 1a and 1b also have pneumatic chambers 2a and 2b defined between the hydraulic shock absorbers 3a and 3b and the vehicle body, by means of rolling diaphragms, the lower ends of which are attached to the outer peripheries of the hydraulic shock absorbers 2a and 2b, and the upper ends of which are connected to the vehicle body.

Vehicle height control is performed by adjusting the pneumatic pressure within the pneumatic chambers 2a and 2b. In order to adjust the pneumatic pressure within the pneumatic chambers 2a and 2b, the vehicle height control system includes a pneumatic pressure control circuit which includes a pneumatic pressure source. In the preferred embodiment, the pneumatic pressure source comprises a reservoir tank 5 connected to a compressor 6 which supplies pressurized air serving as the working pneumatic fluid. The compressor 6 is driven by an electric motor 20. Front and rear pneumatic chambers 2a and 2b are connected to the reservoir tank 5 through a pressure supply circuit. The pressure supply circuit includes an air dehumidifier 7 for dehumidifying the pressurized air from the compressor 6. The air dehumidifier 7 is interposed between the compressor 6 and the reservoir tank 5 and adapted to supply the dehumidified air to the reservoir tank 5 through a one-way check valve 8. An electromagnetic pressure supply control valve 9 disposed within the pressure supply circuit controls the pressure supply to the pneumatic chambers 2a and 2b. Other pressure supply control valves 10a and 10b are disposed in the pressure supply circuit downstream of the pressure supply control valve 9. Each of the pressure supply control valves 10a and 10b is associated with the corresponding pneumatic chambers 2a and 2b. The pressure supply circuit includes a bypass circuit bypassing the pressure supply control valve 9 for directly connecting the air dehumidifier 7 to the pressure supply control valves 10a and 10b. An air outlet is formed in the pressure supply circuit between the compressor 6 and the air dehumidifier 7. An air outlet valve 11 is provided adjacent the air outlet for establishing and blocking communication between the pressure supply circuit and atmosphere.

The valves 9, 10a, 10b and 11 respectively include electromagnetic actuators 12, 13a, 13b and 14 and are themselves electromagnetic valves. The electromagnetic actuators 12, 13a, 13b and 14 are connected to driver circuits 23, 24a, 24b and 25 which control the valve positions by way of driver signal outputs. The driver circuits 23, 24a, 24b and 25 are, in turn, connected to a controller 22 which comprises a microprocessor including an interface 27, CPU 28 and a memory 29.

The controller 22 is connected to vehicle height sensors 15a and 15b through a multiplexer 16, to receive therefrom vehicle height indicative signals. Each of the vehicle height sensors 15a and 15b may comprise an ultra-sonic sensor which transmits ultra-sonic waves in a given ultra-sonic frequency band toward a road surface and measures the elapsed time between transmission and reception of reflected waves from the road surface. Such ultra-sonic vehicle height sensors have been disclosed in the co-pending U.S. patent application Ser. No. 06/650,705, filed on Sept. 14, 1984, U.S Pat. No. 4,630,226 by Haruto TANAKA and assigned to the common assignee to the present invention. The contents of the above-identified co-pending U.S. patent application are hereby incorporated by reference for the sake of disclosure. Alternatively, the vehicle height sensor may comprise an electromagnetic transducer, such as is disclosed in U.S. Pat. No. 4,436,318, issued on Mar. 13, 1984. The contents of the aforementioned U.S. Patent are hereby incorporated by reference for the sake of disclosure. Furthermore, the vehicle height sensor may be the kind of potentiometer disclosed in the co-pending U.S. patent application Ser. No. 795,499, filed on Nov. 6, 1985, U.S. Pat. No. 4,659,104 by Haruto TANAKA et al. and assigned to the common assignee to the present invention. The contents of this co-pending U.S. patent application are hereby incorporated for the sake of disclosure.

The controller 22 is also connected to a pressure sensor 17 in the pressure supply circuit adjacent the pressure reservoir tank 5 for monitoring the internal pressure in the tank. The pressure sensor 17 sends a reservoir pressure indicative signal to the controller.

The controller 22 is also connected to a driver circuit 26 which is, in turn, connected to an electromagnetic relay 19 between the motor 20 and a battery 19. The relay 19 includes an electromagnetic coil energized and deenergized depending upon the presence and absence of a driver signal from the driver circuit 26.

The vehicle height sensors 15a and 15b are mounted near the adjacent front and rear ends of the vehicle respectively for monitoring the vehicle height of the front and rear portions of the vehicle. The multiplexer 16 alternatingly applies the vehicle height indicative signals from the vehicle height sensors 15a and 15b to the controller 22.

In general, the controller 22 controls the driver circuits 23, 24a, 24b and 25 so that the vehicle height at its front and rear ends can be held to within a predetermined height range. Specifically, the controller 22 compares the vehicle height indicative signal from the vehicle height sensors 15a and 15b to given upper and lower adjustment thresholds. Assuming the vehicle height indicative signal from the vehicle height sensor 15a has a value smaller than the lower threshold, the the actuator 13a is energized by the driver signal from the driver circuit 24a to open the pressure supply control valve 10a. At the same time, the actuator 12 is energized to open the pressure supply control valve 9. Thus, fluid communication between the pressure reservoir tank 5 and the pneumatic chamber 2a is established to increase the pneumatic pressure therein. As a result, the front portion of the vehicle is raised. The actuator 13a and 12 are held energized until the value of vehicle height indicative signal from the vehicle height sensor 15a becomes equal to or greater than the lower threshold. On the other hand, when the value of the vehicle height indicative signal from the vehicle height sensor 15a is greater than the upper threshold, the actuators 13a and 14 are energized to open the pressure supply control valve 10a and the outlet valve 11 to vent the pneumatic chamber 2a to atmosphere. As a result, the pneumatic pressure in the pneumatic chamber 2a decreases to lower the vehicle. The actuators 13a are held energized until the value of the vehicle height indicative signal becomes equal to or smaller than the upper threshold.

During vehicle height control, the controller 22 receives the reservoir pressure indicative signal from the pressure sensor 16. As long as the reservoir pressure indicative signal value is high enough to reflect adequate internal pneumatic pressure in the reservoir tank 5, the aforementioned valve control is performed. On the other hand, when the reservoir internal pressure is lower than that required, the pneumatic pressure generated by the compressor 6 is introduced directly into the pneumatic chamber 2a or 2b when increasing the pneumatic pressure therein. Therefore, in such cases, the actuator 12 of the pressure supply control valve 9 is held deenergized to close the valve and block fluid communication between the pneumatic chamber and the pressure reservoir tank.

It should be appreciated that the controller 22 also controls the height of the rear portion of the vehicle on the basis of the value of the vehicle height indicative signal from the vehicle height sensor 15b as explained above. In the case of vehicle height control for the rear portion of the vehicle, the actuator 13b will be operated through the driver circuit 24b instead of the actuator 13a.

Figure 2:
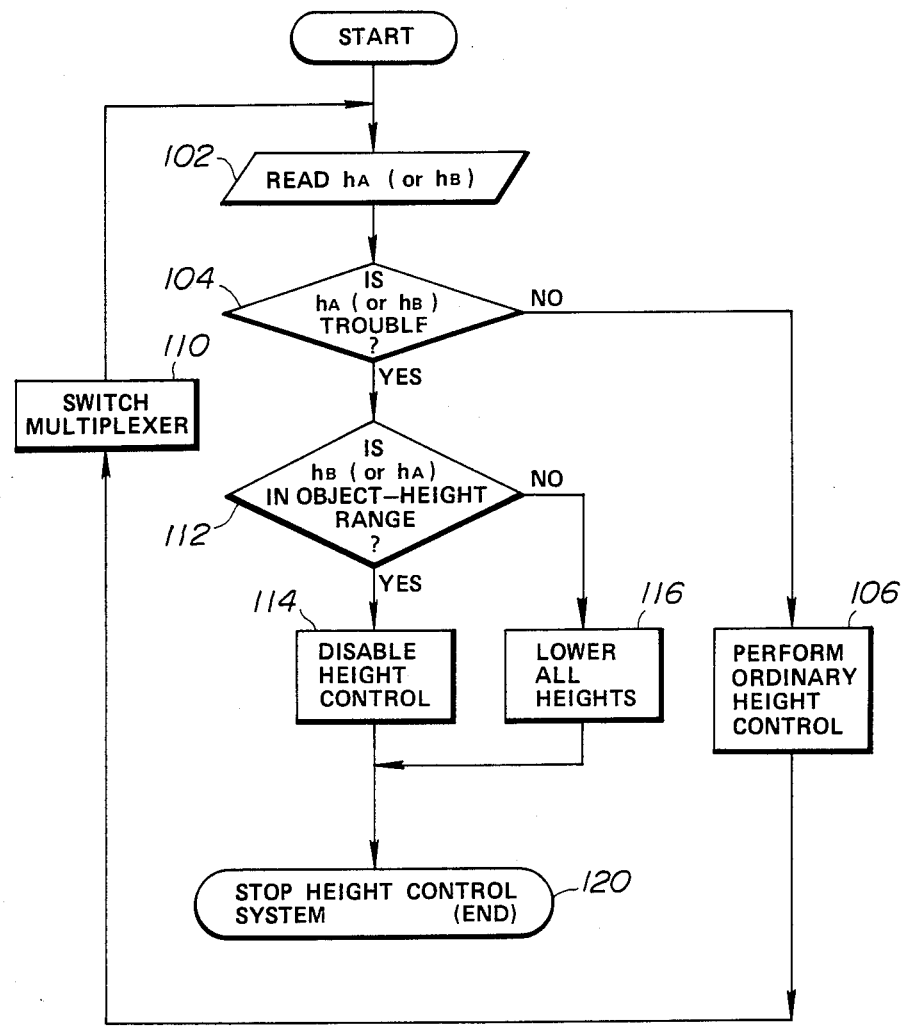
FIG. 2 is a flowchart of a vehicle height control program to be executed by a controller in the vehicle height control system of FIG. 1.

FIG. 2 is a flowchart of the vehicle height control program executed by the controller 22 of FIG. 1. It should be appreciated that the vehicle height control program is executed cyclically at given intervals or continuously. At a step 102, the value $h_A$ of the vehicle height indicative signal from the vehicle height sensor 15a is read out. The value of the vehicle height indicative signal is compared with upper and lower reference values, at a step 104. The upper and lower reference values are determined to correspond to the extremes of vehicle height expected as the vehicle travels along an uneven road surface. When the vehicle height indicative signal value $h_A$ is out of the normal range defined by the upper and lower reference values, then an abnormal vehicle height indicative signal value $h_A$ is recognized at the step 104.

As long as the vehicle height indicative signal value remains within the normal range, the program goes to a step 106 in which it adjusts vehicle height on the basis of the vehicle height indicative signal values using the adjustment thresholds discussed above.

After the step 106, process goes to a step 110 in which the multiplexer 16 is activated to switch input for the controller from the vehicle height indicative signal from the vehicle height sensor 15a to the signal from the vehicle height sensor 15b.

On the other hand, when the vehicle height indicative signal value $h_A$ is outside of the normal range, the vehicle height indicative signal value $h_B$ from the vehicle height sensor 15b is checked at a step 112. If the value $h_B$ of the vehicle height indicative signal from the vehicle height sensor 15b is in the object height range, then, the height adjustment control for the front and rear portions of the vehicle is disabled at a step 114.

Vehicle height control for the front portion of the vehicle is disabled by deactivating the driver circuits 23, 24a and 25 so as to deenergize the actuators 12, 13a, 13b and 14. Therefore, the pneumatic pressure in each of the pneumatic chambers 2a and 2b remains at the level extant immediately before vehicle height control was disabled.

After the step 114, then stop height control stops and the program execution ends at a step 120.

On the other hand, if the vehicle height indicative signal value $h_B$ of the other vehicle height sensor 2b is outside of the normal range when checked at the step 112, then the front and rar vehicle height is forcedly reduced regardless of the vehicle height indicative signal values from the vehicle height sensors, at a step 116. In this case, the front and rear portions of the vehicle are lowered simultaneously.

When lowering the vehicle, the driver circuits 24a, 24b and 25 are activated by the controller 22 to energize the actuators 13a, 13b and 14. As a result, the valves 10a, 10b and 11 are opened to expose the pneumatic chambers 2a and 2b to atmosphere. Therefore, the the pneumatic pressure in the pneumatic chambers 2a and 2b are vented through the air outlet in the pressure supply circuit to decrease the pressure. This causes a reduction in vehicle height at both the front and rear ends of the vehicle.

Preferably, the lowering of the vehicle is performed for a predetermined period.

After the step 116, the height control system is stopped and then program execution ends, at the step 120.

It should be noted that the controller 22 also controls the electric motor 20 by controlling the relay 19. The motor is controlled on the basis of the reservoir pressure indicative signal from the pressure sensor 17. In practice, the controller compares the reservoir pressure indicative signal with a predetermined pressure threshold to drive the motor 20 by energizing the electromagnetic coil in the relay 19 while the reservoir pressure indicative signal value is lower than the predetermined pressure threshold. When the reversoir pressure indicative signal value reaches the predetermined threshold, the controller 22 deenergizes the relay to turn off the motor 20.

As set forth above, according to the present invention, a fail-safe operation for the vehicle height control system is executed in response to abnormal vehicle height indicative signal values. In the fail-safe operation, the other vehicle height is checked to see whether or not the vehicle is already in the object height range. This ensures that the vehicle will be low enough to provide driving stability even if one or more of the vehicle height sensors fail.

Thus, the present invention fulfills all of the objects and advantages sought therefor.

What is claimed is:

1. A vehicle height control system comprising:
   a vehicle height controlling means, having a first component associated with a front suspension system for adjusting the height at the front portion of the vehicle, and a second component associated with a rear suspension system for adjusting the height at the rear portion of the vehicle;
   a vehicle height monitoring means for monitoring vehicle height, said vehicle height monitoring means including at least a pair of first and second vehicle height sensors associated with said first and second components respectively for generating vehicle height indicative signals; and
   a controller selectively receiving one of said vehicle height indicative signals, producing a control signal for controlling a corresponding one of said first and second components of said vehicle height controlling means in accordance with the selected one of said front and rear vehicle height indicative signals in order to maintain the vehicle height within a given object height range, checking whether said selected one of said vehicle height indicative signal values is in a predetermined normal range for detecting an abnormality of said vehicle height indicative signal value, checking the other vehicle height indicative signal value against an object height indicative value range when an abnormality of said selected one of vehicle height indicative signals is detected, and producing control signals for said first and second components of said vehicle height controlling means ordering the vehicle to be lowered when an abnormality of one of said vehicle height indicative signal values is detected and the other vehicle height indicative signal value is within said object height indicative value range, and for disabling vehicle height control of said first and second components by said vehicle height controlling means when an abnormality of one of said vehicle height indicative signal values is detected and the other of said vehicle height indicative signal values is out of said object height indicative range value so that said vehicle height remains at its current level.

2. A vehicle height control system as set forth in claim 1, wherein said first and second vehicle height sensors are connected to said controller through a multiplexer which inputs said front and rear vehicle height indicative signals to said controller alternatingly.

3. A vehicle height control system as set forth in claim 2, wherein said vehicle height controlling means comprises a pneumatic pressure control circuit including first and second pneumatic chambers associated with said front and rear suspension systems, respectively, and controls pneumatic pressure in said pneumatic chambers so as to raise and lower the vehicle depending upon said front and rear vehicle height indicative signals.

4. A vehicle height control system as set forth in claim 3, wherein said pneumatic pressure control circuit further includes a pneumatic pressure source, a first means for establishing and blocking fluid communication between said pneumatic pressure source and said first pneumatic chamber, a second means for establishing and blocking fluid communication between said pressure source and said second pneumatic chamber, and a third means disposed adjacent a ventilation port in said pressure control circuit for establishing and blocking communication between said pressure control circuit and atmosphere, and wherein said first, second, and third means include valves which are opened by said control signal produced in response to detection of an abnormality in both of said front and rear vehicle height indicative signals.

5. A vehicle height control system as set forth in claim 4, wherein said controller outputs said control signals for holding said valves of said first, second and third means open for a predetermined period of time.

6. A vehicle height control system comprising:
   a first suspension system associated with a first vehicle wheel and including a first height adjusting means for adjusting a first relative distance between a first portion of a vehicle body and said first vehicle wheel;
   a second suspension system associated with a second vehicle wheel and including a second height adjusting means for adjusting a second relative distance between a second portion of a vehicle body and said second vehicle wheel;
   a first vehicle height detector for monitoring said first relative distance between said first wheel and said first portion of the vehicle body and producing a first height indicative signal having a value indicative of said first relative distance;
   a second vehicle height detector for monitoring said second relative distance between said second wheel and said second portion of the vehicle body and producing a second height indicative signal having a value indicative of said second relative distance;

means for controlling said first and second height adjusting means as a function of a difference, respectively, between said first and second height indicative signal values and a reference range value to causes said first and second relative distances to be within said reference range;

means for sequentially comparing said first and second height indicative signal values with a normal range indicative reference value for detecting an abnormality of one of said first and second height indicative signal values and for producing an abnormality indicative signal;

means, responsive to said abnormality indicative signal, for comparing the value of the other one of said first and second height indicative signals with a target height range indicative value and disabling height control operation of said controlling means when said other one of first and second height indicative signal values compared with said target height range indicative value is within said target height range, and causing said controlling means to operate said first and second height adjusting means to lower said first and second suspension systems to a predetermined lower position to reduce both of said first and second relative distances to a given reduced value when said other one of said first and second height indicative signal values is out of said target height range.

* * * * *